(12) United States Patent
Schmidt

(10) Patent No.: US 6,688,946 B2
(45) Date of Patent: Feb. 10, 2004

(54) METHOD AND SYSTEM FOR CLEANING WORKPIECES BY WET BLASTING

(76) Inventor: Thomas Tygesen Schmidt, Havrevangen 3, Brædstrup (DK), DK-8740

( * ) Notice: Subject to any disclaimer, the term of this patent is extended or adjusted under 35 U.S.C. 154(b) by 0 days.

(21) Appl. No.: 10/296,586

(22) PCT Filed: May 28, 2001

(86) PCT No.: PCT/DK01/00371

§ 371 (c)(1),
(2), (4) Date: Nov. 26, 2002

(87) PCT Pub. No.: WO01/89768

PCT Pub. Date: Nov. 29, 2001

(65) Prior Publication Data

US 2003/0143929 A1 Jul. 31, 2003

(30) Foreign Application Priority Data

May 26, 2000 (DK) .................... 2000 00836

(51) Int. Cl.⁷ .................................. B24C 3/30
(52) U.S. Cl. ............. 451/38; 451/87; 451/88; 451/89; 451/67; 210/714; 210/252
(58) Field of Search ............. 451/87, 88, 67, 451/86, 80, 89, 3, 38; 210/714

(56) References Cited

U.S. PATENT DOCUMENTS

| | | | | |
|---|---|---|---|---|
| 3,540,156 A | * | 11/1970 | Stibbins et al. ........... 451/86 |
| 3,716,946 A | * | 2/1973 | Graf ........................ 451/3 |
| 3,716,947 A | * | 2/1973 | Carpenter et al. ........ 451/80 |
| 3,742,650 A | * | 7/1973 | Graf et al. ................ 451/67 |
| 4,907,379 A | * | 3/1990 | MacMillan ................ 451/89 |
| 5,014,469 A | * | 5/1991 | Watts ....................... 451/88 |
| 5,134,811 A | * | 8/1992 | Enegren ................... 451/89 |
| 5,552,044 A | | 9/1996 | Abel |
| 5,586,927 A | * | 12/1996 | Herbert .................... 451/88 |
| 5,601,480 A | * | 2/1997 | Nilen ....................... 451/88 |
| 5,637,029 A | | 6/1997 | Lehane |
| 6,419,833 B1 | * | 7/2002 | Lamoureux ............. 210/695 |
| 6,514,128 B1 | * | 2/2003 | Lyras ....................... 451/88 |
| 6,607,670 B2 | * | 8/2003 | Baldwin et al. .......... 210/714 |

* cited by examiner

Primary Examiner—George Nguyen
(74) Attorney, Agent, or Firm—James Creighton Wray; Meera P. Narasimhan

(57) ABSTRACT

An efficient method of cleaning various workpieces is the so-called wet blasting, by which the workpieces are exposed to a spraying of water with a content of hard macro particles. Optimally, this blasting medium should be recirculated, but this implies noticeable problems with respect to separation of cleaned-off dirt and worn-down blasting particles. The invention provides for a system for processing units enabling these problems to be overcome in a relatively simple manner for achieving a high efficiency and low costs of the combined system.

3 Claims, 3 Drawing Sheets

METHOD AND SYSTEM FOR CLEANING WORKPIECES BY WET BLASTING

This application claims the benefit of Danis Application No. 200 00836 filed May 26, 2000 and PCT/DK01/00371 filed May 28, 2001.

BACKGROUND OF THE INVENTION

The present invention concerns a plant for the cleaning of new or used metal parts by so-called wet blasting, namely for degreasing and cleaning of relatively small metal items which are suitable for handling in, for example, drum-like cleaning chambers. Such wet-blasting plants, which in a very effective manner work with a mixture of water and cleaning granulate, are known in different configurations, but the plant according to the invention is so special and advantageous that it is not considered necessary to describe the known technique in further detail.

In brief, it must be mentioned that the relevant technique is not particularly problematic with regard to the actual main task of executing a spraying of the blasting medium on the items, but rather in arranging this in both an effective and operationally economic manner in a recirculation plant for good utilisation of the blasting medium. Depending on its character and wearing qualities, the blasting medium can be reused over shorter or longer periods. However, it will gradually be worn down to such small grain sizes that this fraction will be ineffective in the recirculation process, and therefore must preferably be separated from the blasting medium, i.e. the mixture of liquid (water) and blasting medium. Moreover, the dirt which is removed from the items by the cleaning should be separated from this medium, and at least from time to time there must be effected a certain addition of new blasting medium in order to keep the plant fully effective.

In this connection, a number of part-problems exist which constitute bottlenecks in the overall process, and with the invention it is endeavoured to provide a method and respectively a processing plant which with simple means can ensure an expedient overall function which, by and large, operates in a continuous manner.

SUMMARY OF THE INVENTION

On this basis, the invention comprises a combination of various procedures which, although separately can be varied within certain frameworks, collectively must be considered as being necessary and adequate for solving the tasks presented. It will herewith be of minor significance for the novelty aspect of the invention whether some of the relevant procedures should be known, in so much as they are new in the overall combination according to the invention.

The invention is based on the consideration that an advantageous working procedure can be achieved by dividing the plant into some discrete units for solving part-problems as follows:

1) A processing chamber in which on a movable support the items are exposed to a spraying by the blasting medium from an overlying, downwardly-emitting arrangement for this medium;
2) An underlying collection tank for the collection of the sprayed-on blasting medium with its content of dirt cleaned from the items, and for precipitation of the heavier particles of the medium therein;
3) A transport arrangement such as a worm conveyor for the feeding of the precipitated material up and along an inclined bottom of this tank to an upper bottom outlet.
4) A sedimentation tank for receiving the overflow medium from the collection tank for separation of lighter material fractions from the overflow medium via a filter for the draining off of liquid;
5) A pump for the sucking of surface liquid from the sedimentation tank for pumping further through a pressure pipe to the medium-spraying arrangement in the processing chamber, and
6) An ejector unit inserted in this pressure pipe for the sucking of the concentrated blasting medium from said upper bottom outlet of the collection tank.

With this combination, work can be carried out with a continuous two-stage separation of the lighter material fractions, while maintaining high efficiency and good reusability of the fraction of the blasting medium which has not been worn down.

In the following, the invention is explained in more detail with reference to the drawing, in which

DETAILED DESCRIPTION OF THE PREFERRED EMBODIMENTS

Figure 1:
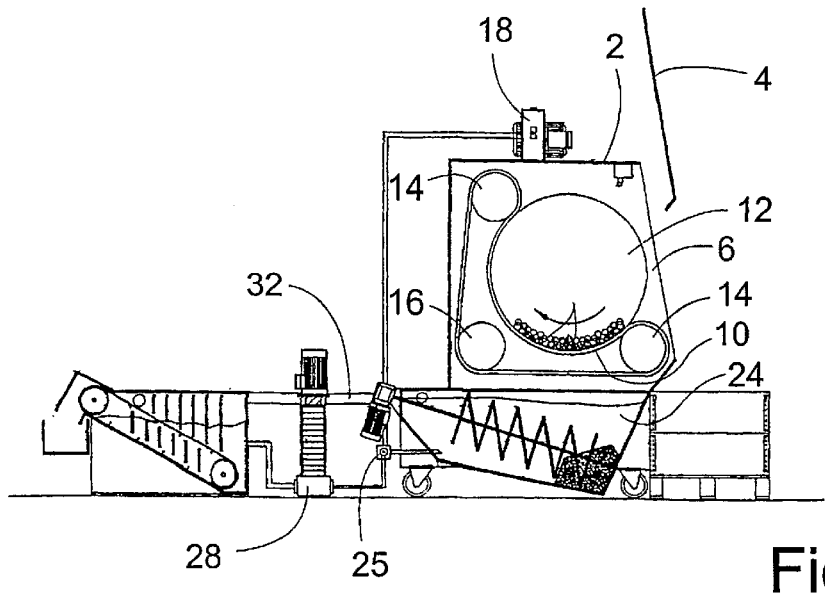
FIG. 1 is a schematic side view of a plant according to the invention, shown during the filling with items.
Figure 2:
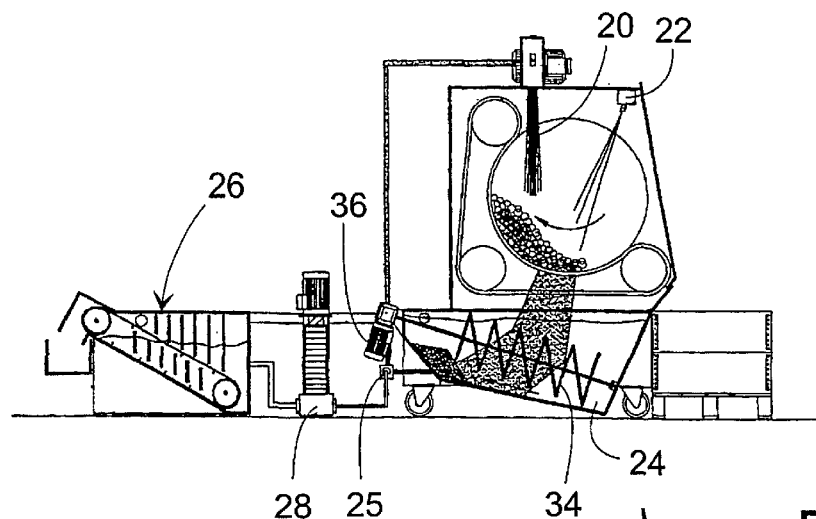
FIG. 2 is a corresponding view shown during cleaning.

The main unit in the plant is a cleaning chamber 2 with a front hatch 4 over an opening 6 which can be opened for the introduction and removal of items 8 to be cleaned. These can be placed on a perforated belt 10 which is supported at its side edges against guide disks 12 which guide the belt along an inclined half-circle between reversing rollers 14, with return run via a roller 16. When the hatch 4 is closed, a spraying of blasting medium towards the items can be effected from a spray head 18, cf. FIG. 2, in that the items are dammed-up and agitated by the feeding of the belt 10 in the direction shown by the arrow. Moreover, clean water can be sprayed from a rinsing nozzle 22 down towards the items for cleaning these by rinsing away the blasting medium.

The blasting medium is fed in a circuit, namely down through the perforated belt 10 to an underlying blasting medium tank 24, and from here via an ejector 25 and a pump 28 back to the spray head 18.

Figure 3:
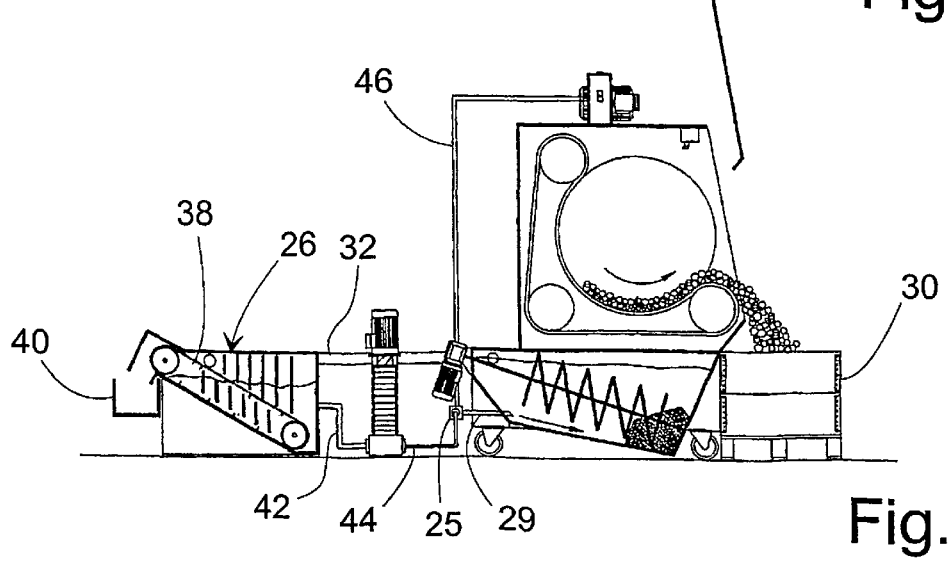
FIG. 3 shows the same during the emptying of items.
Figure 4:
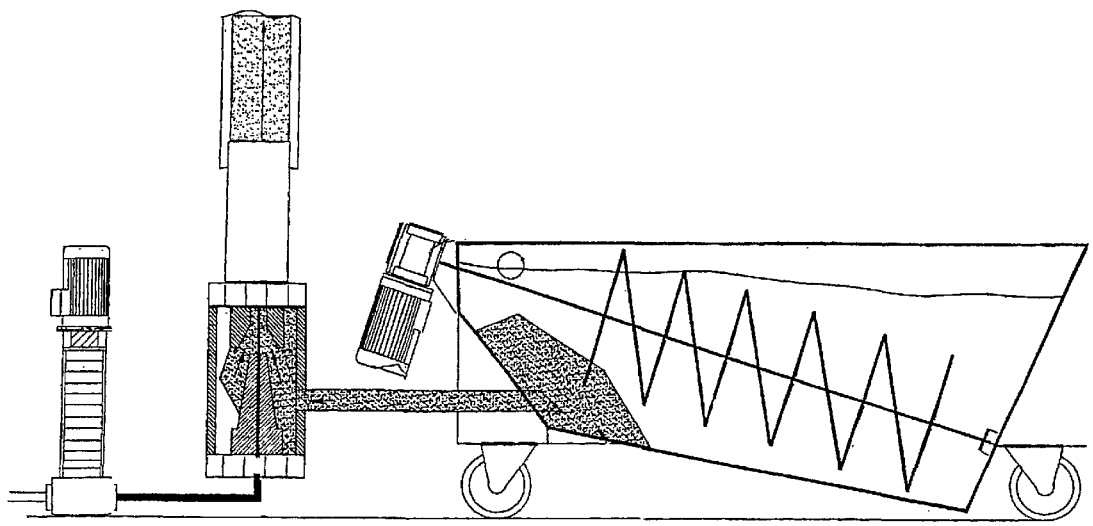
FIG. 4 is a detail view of an injector in the plant.

When the items 8 have been cleaned and rinsed, the hatch 4 can be opened again, FIG. 3, and the items can then be emptied into a mobile receiving bin 30 by reversing the belt 10.

In the blasting medium tank 24, which is held filled with water with an upper overflow pipe 32 to a combined sedimentation and filter unit 26, the blasting medium itself will normally precipitate, and in order to hold the blasting medium suitably mixed with water it has been found advantageous to arrange a controlled feeding of the material to a discharge pipe 29 to the ejector 25, preferably by use of an inclined worm conveyor 34 above an inclined bottom surface in this tank. During the process, or the successive processes, the blasting medium will be subject to a certain wearing down, whereby as mentioned below there will occur a continuous separation of worn-down and herewith ineffective blasting material in the filter unit 26. On the other hand, supplementary blasting medium must be added to the circuit, preferably to the tank 24, for maintaining an effective concentration of blasting medium. Since there will be turbulence in the sullied water in the tank 24, it can not be detected visually or in another direct manner to what degree of filling the blasting medium arises in the tank, whereby great uncertainty arises with regard to the necessary dosing-in of new blasting medium.

With the invention, this problem is solved by introducing a detection of that turning moment with which the drive motor indicated at 36 for the worm conveyor 34 influences this worm conveyor, in that the drive moment will naturally vary with the degree of viscosity of the contents of the tank. Relevant variations in the drive moment can be registered in a purely electrical manner in the power consumption of the drive motor, but with the invention a more mechanical solution to the problem is preferred, namely a contact registration of a swinging-out of the gear motor 36 which drives the worm 34. This motor is suspended hanging out in a radial manner from the core of the worm 34 outside the tank 24, and it will thus be able to swing out from its purely hanging-down position. Such a swinging-out will be dependent on how great a resistance to movement the worm 34 is exposed during its rotation, and on this basis it is possible to arrange a simple contact indication depending on whether the gear motor swings up to a high position as an indication that the blasting medium mixture is now suitably filled with blasting medium, or respectively to a low position in which an addition of new blasting medium will be called for.

In the filter module 26 there are placed a series of vertical plates which damp the turbulence in this chamber, and hereby make possible a sinking down of an appreciable part of the dirt which is added to the water by the cleaning of the items. The dirt sinks down to an inclined conveyor 38 which leads it out for collection in a refuse tray 40, and which at the same time can serve to drain water from the material.

The water which is transferred to the filter unit 26 via the overflow pipe 32 will typically contain both cleaned-off dirt and particles of worn-down blasting medium, and the discharge water which is led through a pipe 42 to the pump 28 will thus be more or less free of larger particles. It is this water which from the pump 28 is brought through a pipe 44 to the ejector 25 for suction of the water-mixed blasting medium through the pipe 29, and pressing forward of this hydraulic blasting medium through a pipe 46 to the spray head 18.

Figure 5:
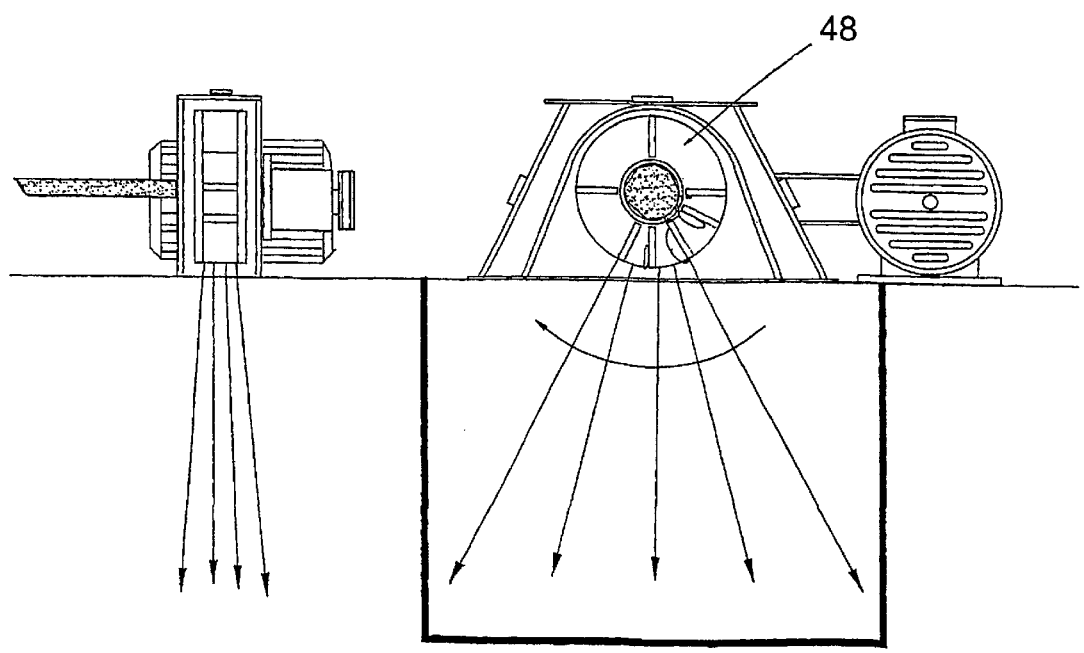
FIG. 5 is a detail view of a spraying-in unit for blasting jets.

This spray head 18 is preferably configured as shown in FIG. 5, namely as a vane rotor 48 which from the axially-supplied water can throw this out over the whole breadth of the processing area inside the main chamber.

Figure 6:
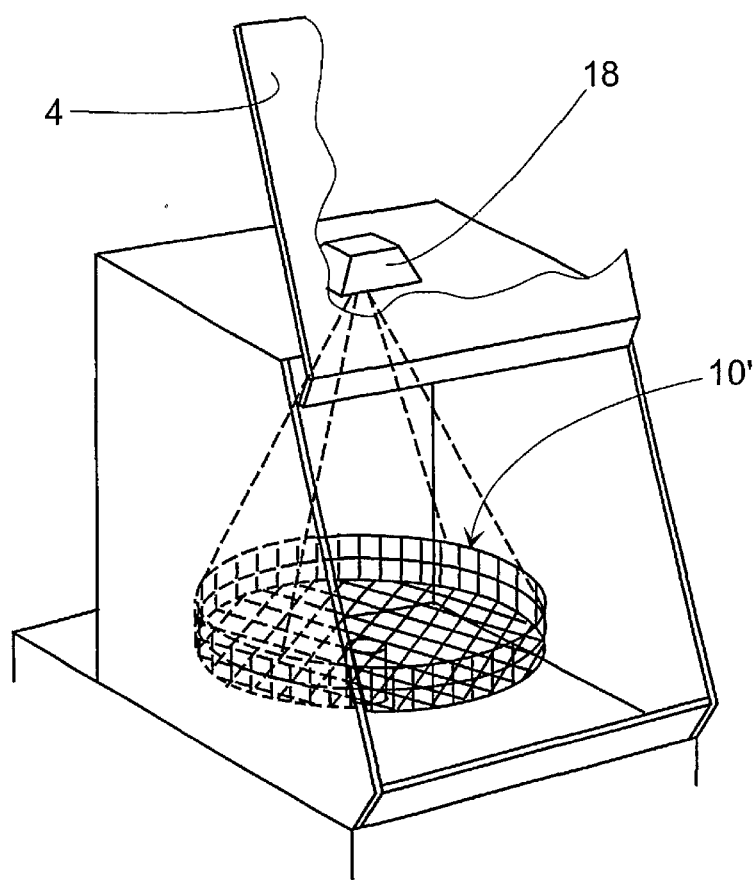
FIG. 6 is a schematic perspective view of a modified processing chamber in the plant.

In FIG. 6 it is indicated that for the support of larger processing items, use can be made of a rotating support disk or basket in the chamber 2, driven in any suitable manner and including reversing operation. The spray head 18 can be used unchanged, even though it works mainly with a slinging-out of the blasting medium in a rectangular stream which is narrower than the diameter of the support disk.

Figure 7:
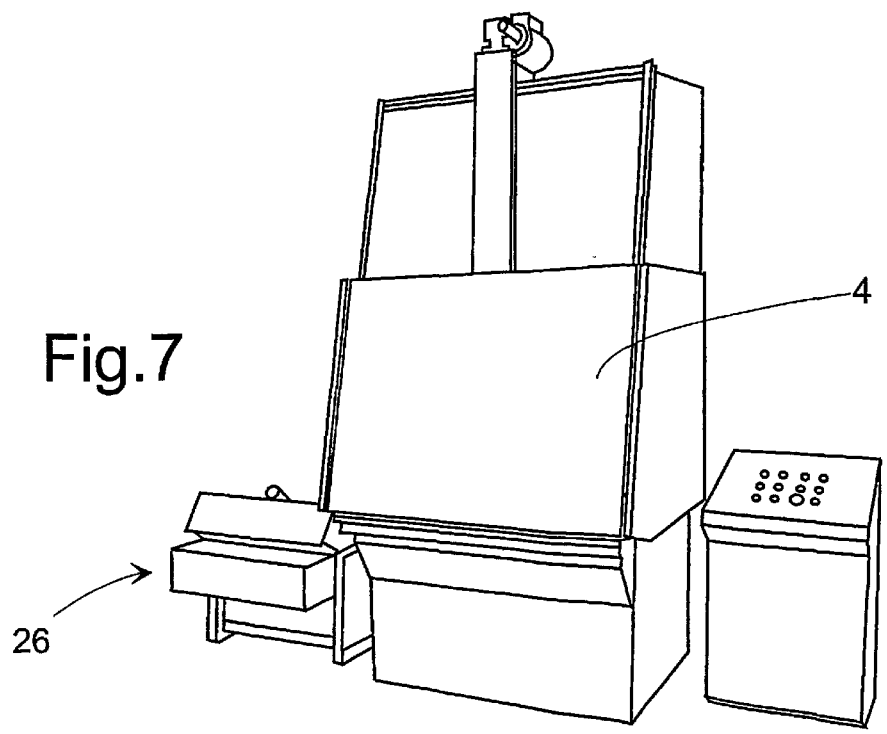
FIG. 7 is a view of the whole plant seen in perspective.

FIG. 7 shows a practical configuration of the plant, including with special regard to a possible upper arrangement for the movement of the cover plate 4. It must be noted that work can possibly be carried out with several filter modules 26, and that various modifications can be introduced such as the building together of the filter unit 26 and the pump 28.

What is claimed is:

1. Method for the cleaning of metal items by wet blasting, by which the items are exposed to spraying by a blasting medium in the form of a liquid, preferably water, with a considerable content of a cleaning blasting medium in the form of macro-particles, in that after being sprayed on the items the blasting medium is collected for re-circulation, and in that a continuous or intermittent separation of the cleaned-off dirt and worn-down blasting medium is arranged, while a supplementary supply of new blasting medium is added to the blasting medium, characterised by the combination of, a) the leading of the sprayed-on blasting medium with its content of dirt and blasting medium down to a collection tank with an inclined bottom, along which a sediment in the blasting medium is led upwards by means of a suitable conveyor such as a worm conveyor for delivery to an upper bottom outlet, b) the leading of the medium overflowing from the collection tank to a sedimentation tank to enable a calm sinking-down of the sediment material towards an underlying conveyor, which leads this material upwards and outwards from the tank, c) that from an intermediate level in the sedimentation tank, partly cleaned water is sucked off, which via a pump is fed under pressure to an ejector unit from which the liquid is led further to a unit for the spraying of blasting medium out over the items, d) that from said upper bottom outlet in the collection tank, concentrated blasting medium is supplied to the ejector unit for mixing with the flow of water which is fed from the ejector unit to the spray head, and e) that the spraying of the items is effected preferably by supplying blasting medium to a rotating vane wheel which throws the medium towards a movable support surface for the items.

2. Method according to claim 1, wherein the supply of supplementary blasting medium is effected depending on a determination of the viscosity of the concentrated blasting medium in the collection tank, preferably by a registration of the counter-effect on the transport means working therein.

3. Plant for the execution of the method according to claim 1, and configured with means which are suitable for combinational execution of the disclosed stages a)–e) of the method.

* * * * *